March 10, 1931.  H. A. McCREA  1,796,210
STARTING ARRANGEMENT FOR DYNAMO ELECTRIC MACHINES
Filed May 17, 1929
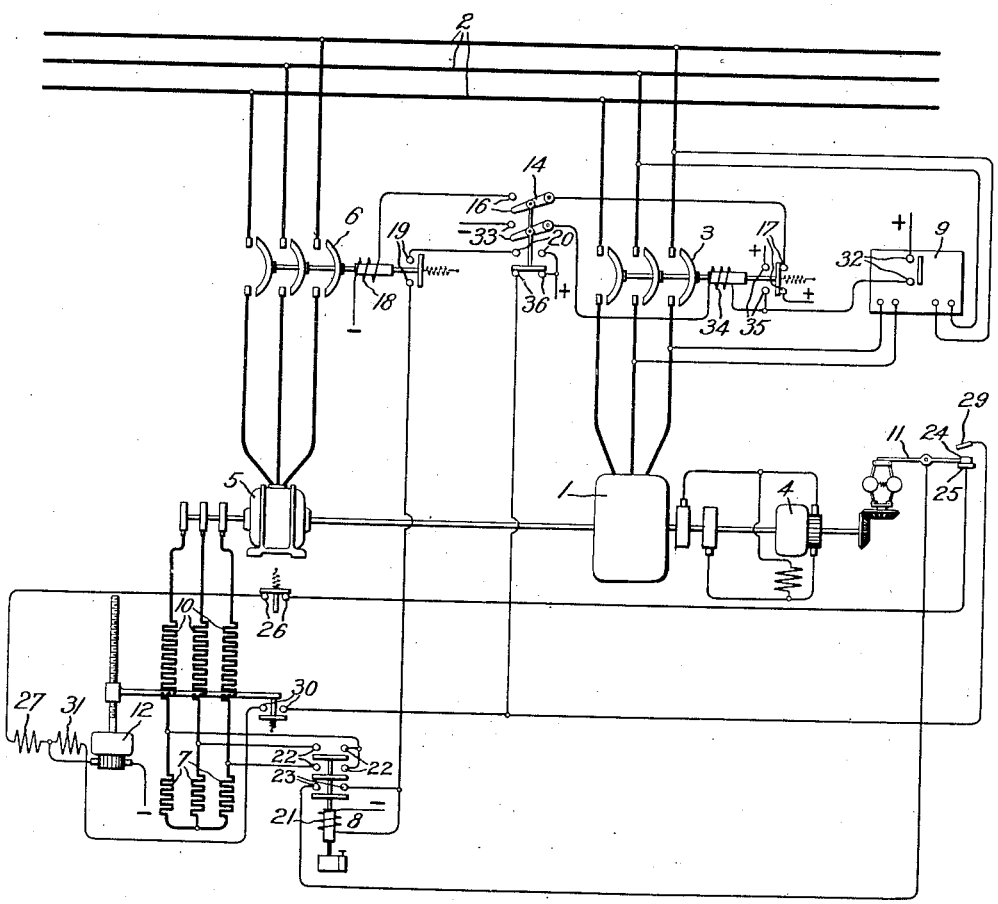
Inventor:
Hugh A. McCrea,
by Charles E. Tullar
His Attorney.

Patented Mar. 10, 1931

1,796,210

UNITED STATES PATENT OFFICE

HUGH A. McCREA, OF SCHENECTADY, NEW YORK, ASSIGNOR TO GENERAL ELECTRIC COMPANY, A CORPORATION OF NEW YORK

STARTING ARRANGEMENT FOR DYNAMO-ELECTRIC MACHINES

Application filed May 17, 1929. Serial No. 363,914.

My invention relates to starting arrangements for synchronous dynamo electric machines such as synchronous motors, condensers and the like and its object is to provide an improved starting arrangement whereby a large synchronous machine can be started and automatically brought into synchronism with a system and then connected to the system without producing a large electric disturbance on the system.

My invention will be better understood from the following description when taken in connection with the accompanying drawing and its scope will be pointed out in the appended claims.

Referring to the drawing which shows diagrammatically a starting arrangement for a synchronous motor, 1 represents a synchronous motor which is adapted to be connected to a polyphase supply circuit 2 by means of a switch 3 which may be of any suitable type, examples of which are well known in the art. The field winding of the motor 1 may be supplied with direct current from any suitable source such as an exciter 4 direct connected to the motor 1. As shown in the drawing, the field winding of the motor 1 is permanently connected across the exciter terminals but it is obvious that suitable switching means, examples of which are well known in the art, may be provided in the motor field circuit if desired.

For effecting the starting of the motor 1 I provide a phase wound induction motor 5 which is direct connected to the motor 1. In order that the starting motor 5 may drive the main motor 1 at and above synchronous speed, the starting motor is preferably designed with a smaller number of field poles than the motor 1 so that the synchronous speed of the starting motor is higher than the synchronous speed of the main motor. The primary winding of the starting motor 5 is adapted to be connected across the polyphase supply circuit 2 by means of a switch 6 which may be of any suitable type. The starting resistors 7 are provided in the phase wound secondary circuit of the starting motor 5 so that the motor has a good starting torque and takes a relatively small starting current from the supply circuit 2. In order that the starting motor 5 may drive the main motor 1 above its synchronous speed after the motor 5 has been started, a short-circuiting device shown as a contactor 8 is provided for short-circuiting the resistors 7.

For controlling the closing of the switch 3 between the main motor 1 and the circuit 2, I provide an automatic synchronizer 9 which may be of any suitable type, examples of which are well known in the art, for effecting the closing of a circuit breaker when a predetermined relation exists between the phases of two alternating current circuits. Since the details of such an automatic synchronizer form no part of my present invention and, furthermore, are old and well known in the art, I have shown the automatic synchronizer schematically in order to simplify the disclosure of my present invention. Preferably, the automatic synchronizer 9 is arranged to effect the closing of the switch 3 only when both the frequency difference and the phase difference between the voltages of the motor 1 and the circuit 2 are less than predetermined amounts.

In order that the desired phase and frequency relation between the motor 1 and the circuit 2 may be produced to effect the operation of the automatic synchronizer 9, I provide means for varying the secondary resistance of the starting motor 5 in accordance with the speed thereof so that the speed of the synchronous motor 1 is oscillated through its synchronous speed. Any suitable means, examples of which are well known in the art, which is responsive either to the actual speed thereof or the difference between the speed thereof and its synchronous speed, may be used to accomplish this result.

This result is obtained in the embodiment of my invention shown in the drawing by providing an adjustable rheostat 10, shown as a motor operated rheostat, in the secondary circuit of the motor 5 and controlling the operation of the rheostat 10 by means of a suitable speed responsive device 11, examples of which are well known in the art, after the motor 5 has been started. As shown in the drawing, the speed responsive device is a centrifugally operated switch which is driven by the motor 5 and which is arranged to complete circuits for the motor 12 of the rheostat 10 so that the secondary resistance of the motor 5 is increased when the speed of the motor 1 is above its synchronous speed and the secondary resistance of the motor 5 is decreased when the speed of the motor 1 is below its synchronous speed. The resistance of the rheostat 10 is such that when it is all connected in the secondary circuit of the motor 5, the speed of the motor 5 is below the synchronous speed of the main motor 1.

The starting and stopping of the main motor 1 may be effected in response to the operation of any suitable control means, examples of which are well known in the art. As shown in the drawing, the starting and stopping of the motor 1 is effected by the closing and opening of a manually controlled switch 14.

The operation of the arrangement shown in the drawing is as follows:

When the control switch 14 is open, the switches 3 and 6 are open and the other control devices occupy the positions in which they are shown in the drawing. When the control switch 14 is closed, its contacts 16 complete through the auxiliary contacts 17 on the open switch 3 an energizing circuit for the closing coil 18 of the switch 6 so that the primary winding of the starting motor 5 is connected across the supply circuit 2 to start the motor 1. The closing of the auxiliary contacts 19 on the switch 6 completes through the contacts 20 of the control switch 14 an energizing circuit for the operating winding 21 of the resistor short-circuiting contactor 8. The contactor 8 is designed in any suitable manner so that it does not close its contacts until after the motor 5 has been in operation for a predetermined length of time. When the contactor 8 closes its main contacts 22 to short-circuit the starting resistors 7, the closing of the auxiliary contacts 23 which are in the circuit of the motor 12 of the motor operated rheostat 10, renders the motor 12 operative to control the operation of the rheostat 10 in accordance with the position of the speed responsive device 11.

Since the rheostat 10 is preferably designed so that when all of the resistance of the rheostat is connected in the secondary circuit of the motor 5 the speed of the motor is below the synchronous speed of the main motor 1, the contacts 24 and 25 of the speed responsive device 11 are closed when the contactor 8 operates to close its contacts and, therefore, a circuit is completed for the motor 12 to decrease the secondary resistance of the motor 5 when the contacts 23 of the relay 8 are closed. This circuit of the motor 12 also includes the contacts 20 of the control switch 14, the auxiliary contacts 19 on the switch 6, the contacts 24 and 25 of the speed responsive device 11, the limit switch 26 on the rheostat 10, and field winding 27 and armature winding of the motor 12. The motor 12 continues to decrease the secondary resistance of the motor 5 until either the automatic synchronizing device 9 operates to effect the closing of the circuit breaker 3 or the speed of the motor 5 is increased to such a value that the speed responsive device 11 opens its contacts 24 and 25 and closes its contacts 24 and 29. When the contacts 24 and 29 of the speed responsive device 11 are closed, another circuit is completed for the motor 12 so that it operates the rheostat 10 to increase the secondary resistance of the motor 5 and thereby decrease the speed of the motor 5 until either the synchronizing device 9 operates to close the switch 3 or the speed responsive device 11 opens its contacts 24 and 29 and closes its contacts 24 and 25. This circuit of the motor 12 includes the contacts 20 of the control switch 14, the auxiliary contacts 19 on the switch 6, the contacts 23 of the contactor 8, the contacts 24 and 29 of the speed responsive device 11, the limit switch 30 on the rheostat 10, and field winding 31 and armature winding of motor 12. The speed responsive device 11, therefore, operates to control the rheostat 10 in the secondary circuit of the starting motor 5 after it has been started, so that the speed of the motor 1 is oscillated through its synchronous speed until the automatic synchronizer 9 operates to effect the closing of the switch 3.

When the desired phase and frequency relation exists between the voltage of the machine 1 and the circuit 2, the automatic synchronizing device 9 operates to close its contacts 32 and thereby complete through the contacts 33 of the control switch 14 an energizing circuit for the closing coil 34 of the switch 3 to effect the connection of the synchronous motor 1 to the circuit 2. The switch 3, by closing its auxiliary contacts 35, completes a locking circuit for its closing coil 34 which is independent of the contacts 32 of the automatic synchronizer 9.

When the switch 3 closes, the opening of its auxiliary contacts 17 effects the deenergization of the closing coil 18 of the switch 6 so that the primary winding of the starting motor 5 is disconnected from the supply circuit 2. The opening of the auxiliary contacts 19 of the switch 6 opens the heretofore described circuits for the contactor 8 and the motor 12 so that the short-circuit around the starting resistors 7 is removed and the control of the motor operated rheostat 10 is removed from the speed responsive device 11.

When it is desired to shut down the motor 1, the control switch 14 is opened. The opening of the contacts 33 of the control switch 14 effects the deenergization of the closing coil 34 of the switch 3 so that this switch opens and disconnects the motor 1 from the supply circuit 2. The control switch 14 by closing its contacts 36 completes an energizing circuit for the motor 12 of the motor operated rheostat 10 through the limit switch 30 and the motor field winding 31 so that the motor 12 operates to insert all of the resistance of the rheostat 10 into the secondary circuit of the motor 5. Therefore all of the resistance of the rheostat is in the secondary circuit of the motor 5 when it is restarted.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is,—

1. In combination, an alternating current circuit, a synchronous dynamo electric machine, a starting dynamo electric machine for said synchronous machine, means dependent upon the speed of said starting machine for controlling the speed thereof to oscillate said synchronous machine through synchronous speed, and automatic synchronizing means responsive to the relative phases of said machine and circuit for connecting said machine to said circuit.

2. In combination, an alternating current circuit, a synchronous dynamo electric machine, an alternating current starting motor for said machine connected to said circuit, means dependent upon the speed of said motor for controlling the speed thereof to oscillate said machine through synchronous speed, and automatic synchronizing means responsive to the relative phases of said machine and circuit for connecting said machine to said circuit for effecting the disconnection of said motor from said circuit.

3. In combination, an alternating current circuit, a synchronous dynamo electric machine, a phase wound induction starting motor for said machine having a smaller number of poles than said machine and connected to said circuit, means dependent upon the speed of said motor for varying the resistance of the secondary circuit of said motor, and automatic synchronizing means responsive to the relative phases of said machine and circuit for connecting said machine to said circuit.

4. In combination, an alternating current circuit, a synchronous dynamo electric machine, a phase wound induction starting motor for said machine having a smaller number of poles than said machine and connected to said circuit, impedance means connected in the secondary circuit of said motor, regulating means for controlling the amount of said impedance means in the secondary circuit of said motor, means responsive to the speed of said motor for controlling said regulating means, and automatic synchronizing means responsive to the relative phases of said machine and circuit for connecting said machine to said circuit and for removing the control of said regulating means from said speed responsive means.

5. In combination, an alternating current circuit, a synchronous dynamo electric machine, a phase wound induction starting motor for said machine having a smaller number of poles than said machine and connected to said circuit, means dependent upon the speed of said motor for varying the resistance of the secondary circuit of said motor, and automatic synchronizing means responsive to the relative phases of said machine and circuit for connecting said machine to said circut and for effecting the disconnection of said motor from said circuit.

6. In combination, an alternating current circuit, a synchronous dynamo electric machine, a phase wound induction starting motor for said machine having a smaller number of poles than said machine and connected to said circuit, impedance means connected in the secondary circuit of said motor, regulating means for controlling the amount of said impedance means connected in the secondary circuit of said motor, means dependent upon the speed of said motor for controlling said regulating means, automatic synchronizing means responsive to the relative phases of said machine and circuit for connecting said machine to said circuit, and means responsive to the connection of said machine to said circuit for effecting the disconnection of said motor from said circuit.

7. In combination, an alternating current circuit, a synchronous dynamo electric machine, a phase wound induction starting motor for said machine having a smaller number of poles than said machine and connected to said circuit, impedance means connected in the secondary circuit of said motor, regulating means for controlling the amount of said impedance means connected in the secondary circuit of said motor, means responsive to the speed of said motor for controlling said regulating means, automatic synchronizing means responsive to the relative phases of said machine and circuit for connecting said machine to said circuit, and means responsive to the connection of said machine to said circuit for effecting the disconnection of said motor from said circuit and for removing the control of said regulating means from said speed responsive means.

In witness whereof, I have hereunto set my hand this 16th day of May, 1929.

HUGH A. McCREA.